Figure 4:
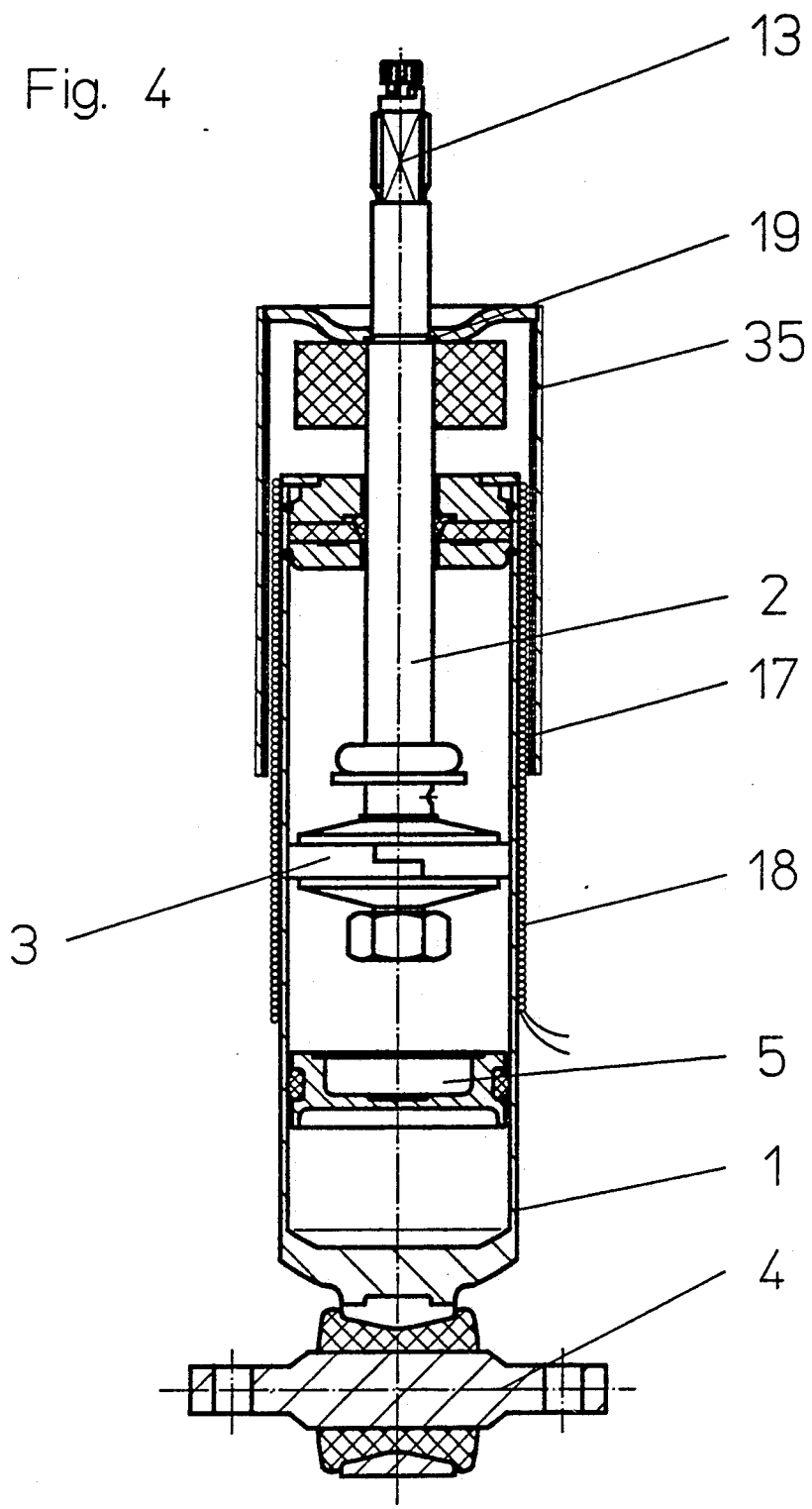

United States Patent [19]

Herberg et al.

[11] Patent Number: 5,009,450

[45] Date of Patent: Apr. 23, 1991

[54] VIBRATION-ABSORBER SENSOR FOR A SEMI-ACTIVELY CONTROLLED CHASIS WITH A RELATIVE-VELOCITY SENSOR AND WITH ELECTRONICS FOR PROCESSING THEIR OUTPUTS

[75] Inventors: Gerhard Herberg, Menden; Hans-Jürgen Hoffmann, Wuppertal; Ludger Gesenhues, Dortmund; Zhen Huang, Wuppertal; Reinhard Höscher, Salzkotten, all of Fed. Rep. of Germany

[73] Assignee: August Bilstein GmbH & Co. KG, Ennepetal, Fed. Rep. of Germany

[21] Appl. No.: 488,703

[22] Filed: Mar. 5, 1990

[30] Foreign Application Priority Data

Mar. 21, 1989 [DE] Fed. Rep. of Germany ....... 3909190

[51] Int. Cl.⁵ ............................................. B60G 11/26

[52] U.S. Cl. ................................................ 280/707
[58] Field of Search ..................................... 280/707

[56] References Cited

U.S. PATENT DOCUMENTS

| | | | |
|---|---|---|---|
| 4,550,286 | 10/1985 | Holland et al. | 280/707 |
| 4,638,670 | 1/1987 | Moser | 280/707 |
| 4,674,768 | 6/1987 | Morra | 280/707 |
| 4,776,437 | 10/1988 | Ishibashi et al. | 280/707 |

Primary Examiner—Kenneth R. Rice
Attorney, Agent, or Firm—Max Fogiel

[57] ABSTRACT

The invention concerns a vibration-absorber sensor for the semi-actively controlled chassis of a motor vehicle wherein the relative velocity of the wheel mass to the body mass is measured with a sensor winding and a permanent magnet and processed in a circuit.

6 Claims, 4 Drawing Sheets

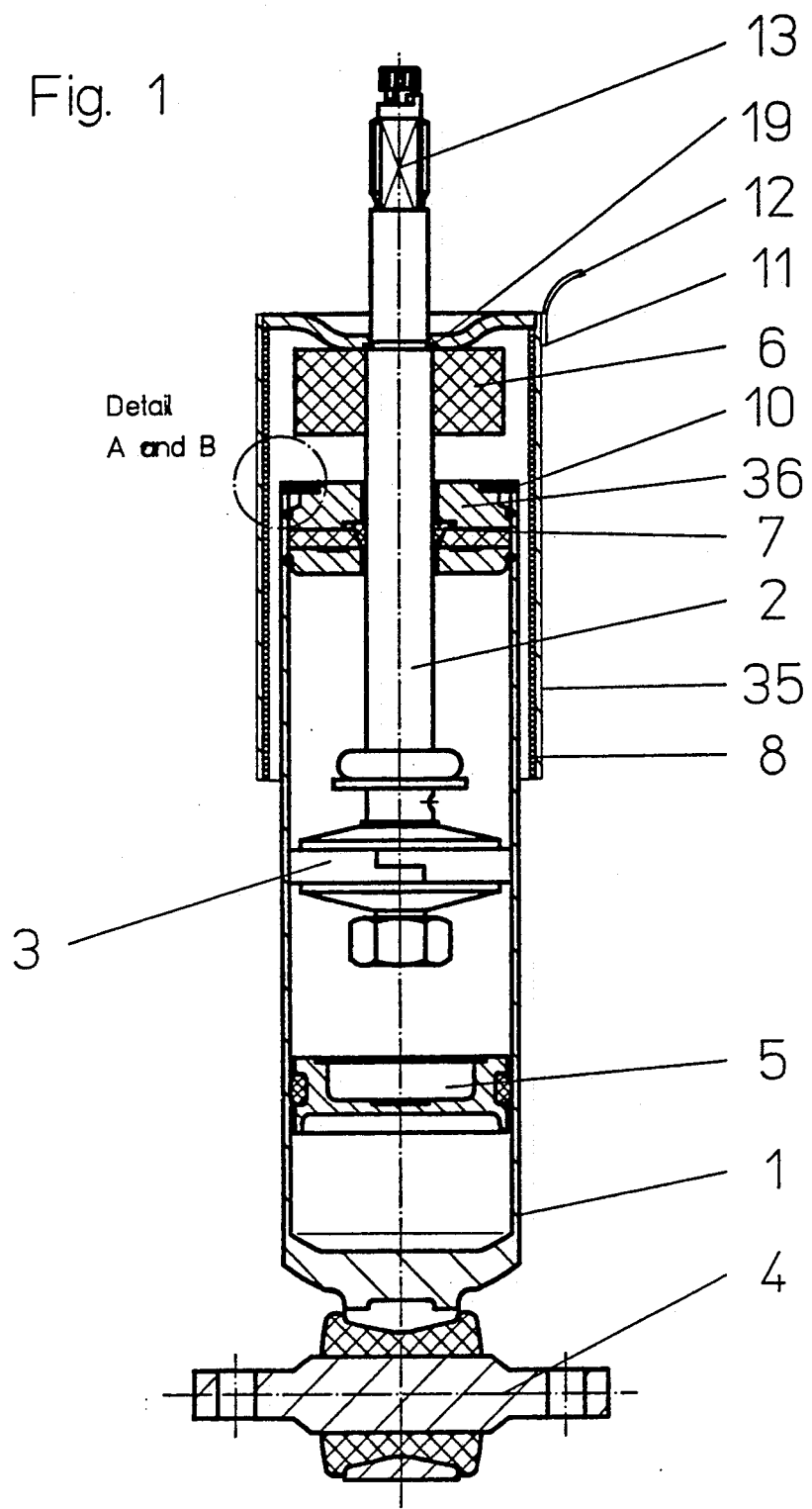

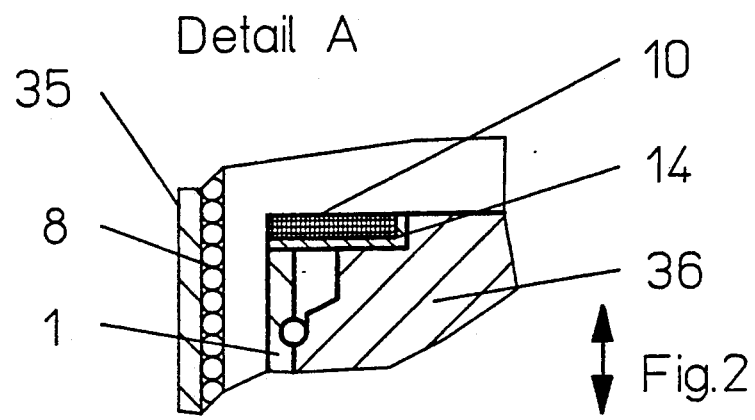
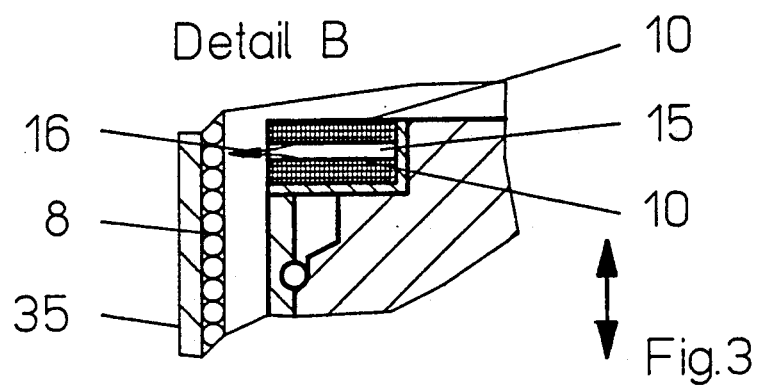
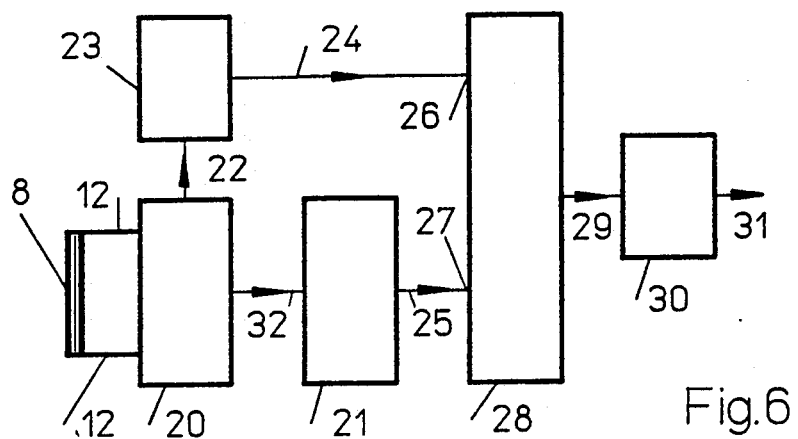

VIBRATION-ABSORBER SENSOR FOR A SEMI-ACTIVELY CONTROLLED CHASIS WITH A RELATIVE-VELOCITY SENSOR AND WITH ELECTRONICS FOR PROCESSING THEIR OUTPUTS

The invention concerns a vibration-absorber sensor for measuring the velocity of the body of a motor vehicle in relation to the particular axis. The intermediate mechanism that more or less transmits vibrations transmitted from the surface of the road by way of the wheel suspension to the body is generally a vibration absorber. Variable hydraulic absorbers are generally employed.

Variable shock absorbers controlled with electronic circuitry that acts on an electromagnet in a valve is known from German OS No. 2 738 455. These shock absorbers operate on the multiple-parameter system, detecting the relative velocity of the vibration absorber etc. by way of what are called disturbance monitors and controlling them by way of a complicated electrohydraulic servo-cylinder system.

Another way of monitoring and processing the operating state of a vibration absorber in a wheel suspension without using a special stationary testing device is known from German OS No. 3 316 011.

German Pat. No. 3 518 503 describes a control system that combines various signals, including body acceleration, and computes from them the heights of bumps in the road. The object is to optimize the absorber subject to practically any conceivable road conditions.

German OS No. 3 536 201 discloses a device for detecting the relative position of two relatively moving parts in order to determine elevation. The device interferes with the field of a permanent magnet. German OS No. 3 522 010 describes an odometer that operates on the same principle and can also be employed for controlling heights, as does German OS No. 3 538 349.

German GM No. 8 524 086 discloses a sensor that has two windings, at least one of which must be supplied with electricity from outside.

German OS No. 2 303 104 describes an acceleration sensor that moves a coil inside a magnetic field.

Also known are methods in which the thrust of a shock absorber is measured with special displacement sensors. These sensors, however, do not directly supply a velocity signal, which require differentiating the displacement.

The object of the invention is to measure the velocity of the mass of the body of a vehicle relative to that of its wheel mass in order to increase the riding safety and comfort of a road vehicle. The component should also be active.

This object is attained in that the relative velocity is measured at the vibration absorber between the body mass and the wheel mass in that a permanent magnet is secured to the stationary component of the absorption cylinder and a sensor winding is accommodated in the moving housing. When vibrations occur, the magnetic flux generates an electric signal in the moving winding that depends on their distance and direction and is accordingly proportional to the relative velocity. This economical approach allows very precise measurement of the relative velocity with no need to differentiate or integrate the signal. Subsequent processing generates a control signal that is forwarded to an electromagnetic valve, closing the control circuit.

The overall control philosophy is based on what is called the skyhook principle.

Figure 5:
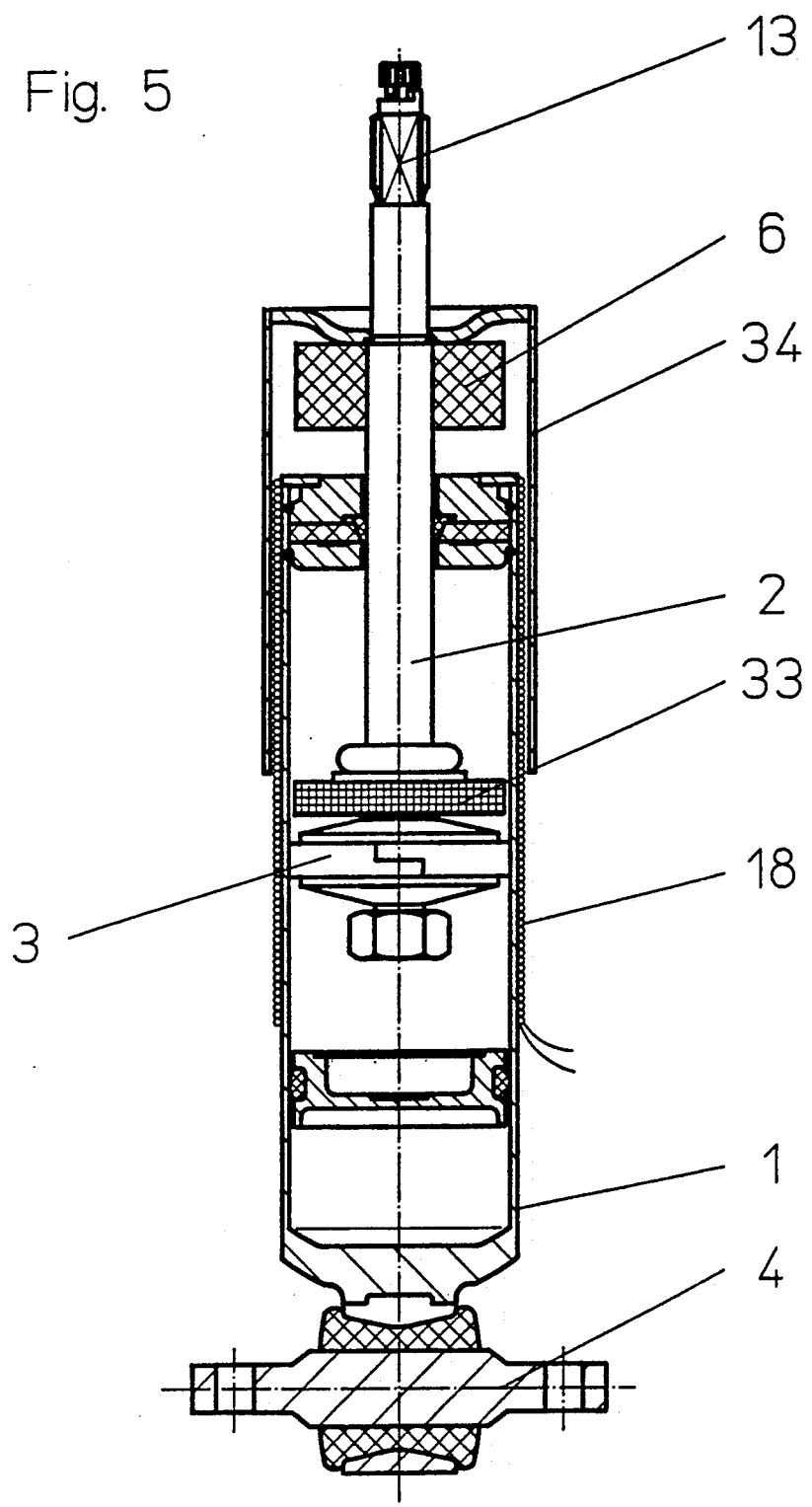

Various embodiments of the invention will now be described with reference to the schematic drawings, wherein FIG. 1 illustrates a vibration absorber with a sensor winding in the housing and a permanent magnet on the absorber cylinder, FIG. 2 is a larger-scale view of the detail A in FIG. 1, showing the sensor winding and the permanent magnet with a spacer, FIG. 3 is a larger-scale view of the detail B in FIG. 1, showing the sensor winding and a permanent-magnet system, FIG. 4 illustrates an absorber with a sensor winding accommodated on the absorber cylinder and a magnet in the housing, FIG. 5 illustrates an absorber with a sensor winding accommodated on the absorber cylinder and a magnet on the moving piston rod, and FIG. 6 illustrates an electronic processing circuit.

A vehicle consists in simple terms of two masses—that of the body and that of the wheels. Between the two masses is a spring and a vibration absorber. The vibration absorber is mounted with its cylinder 1 connected by an interlocking joint 4 to the wheel mass, meaning that the cylinder represents the moving component of the system. This statement is of course relative in that the housing 35 in a vibration absorber of this king is absolutely free to move too. For simplicity's sake, however, cylinder 1 shall be considered to move in what follows and the housing 35, which is secured to a piston rod 2, to be stationary. The rod interlocks with the vehicle's body mass by way of a fastener 13.

The vibration absorber is a variable hydraulic absorber designed in accordance with the invention as will now be described.

Cylinder 1 contains two operating chambers separated by a partition 5. Below partition 5 is a gas-filled space that compensates for increases and decreases in the capacity of the hydraulic operating chamber resulting from the volume of piston rod 2 as it travels out and in. In the larger operating chamber above partition 5, a piston 3 is secured to piston rod 2, which extends through a tight cap 36 and is sealed off with a seal 7. Above partition 5 in cylinder 1 is a hydraulic fluid. A permanent magnet 10 is secured to cap 36.

Outside cylinder 1 and above a joint 19 on piston rod 2 is housing 35, which is in the form of a protective tube. One end of the housing is open and it is mounted over the cylinder. Embedded in housing 35 is a sensor winding 8, which can extend over the total length. The housing must be made of an antimagnetic material. It is accordingly possible to manufacture the winding in the form of an air coil and then extrude plastic around it. Between magnet 10 and winding 8 is an air gap. When an irregularity in the roadway forces cylinder 1 up, magnet 10 will rise inside the winding 8 that surrounds it. The lines of magnetic force emitted from magnet 10 are intersected by the winding, inducing a current in it. The resulting signal is proportional to the velocity and is accordingly a measure of the relative velocity.

The object of the invention accordingly not only accommodates the piston rod but also very inexpensively supplies a voltage that represents the relative velocity.

The electric connection 12 to winding 8 can easily be continuous, although the device will be easier to service is it extends to the processing circuit through a waterproof plug 11.

In one embodiment of the invention, magnet 10 does not rest directly on cap 36 and there is an antimagnetic spacer 14 between cap 36 and magnet 10 that prevents the iron in cylinder 1 from attenuating the magnetic force. The structure is illustrated in FIG. 2. When a cylinder is made out of antimagnetic material, the spacer can sometimes break down.

The magnetic force can be increased and simultaneously augmented by the magnetic system illustrated in FIG. 3. This system consists of two axially magnetized permanent magnets 10 with their equivalent poles facing each other. Between them is a pole shoe 15 of ferromagnetic iron. The forces of repulsion meet at the iron and are more or less deflected outward as represented by arrow 16. The magnetic flux is accordingly selectively oriented toward winding 8 and increases the electric signal.

FIG. 4 illustrates a vibration absorber that is designed in accordance with the opposite principle. A sensor winding is wrapped around the outside of cylinder housing 1 and has a dielectric cast around it to protect it from outside influences. Housing 35 is provided with a permanently magnetic coating 17. When the system moves, a voltage proportional to the relative velocity is analogously induced in the winding.

FIG. 5 illustrates still another embodiment of the invention wherein winding 18 again rests against the outside of absorber cylinder 1. In this version, however, it is important for the cylinder to be made of an antimagnetic material, aluminum for example. The permanent magnet 33 that induces the voltage is in cylinder 1. It can for example be permanently mounted on piston rod 2 in front of piston 3. The sole purpose of housing 34 in this case is protection. Motion of the vibration absorber will, as in the other embodiments, generate an electric voltage proportional to the relative velocity.

The velocity of the body mass as determined by known methods is also exploited to selectively control the relative velocity between the body mass and the wheel mass.

The signal induced proportional to the relative velocity between the body mass and the wheel mass is forwarded to a filter 20 by way of electric connection 12. The filter is intended to remove interference. The test signal is simultaneously forwarded to an error detector 23 by way of a connection 22. This component detects broken cable or excessive transition resistance and forwards the information by way of a line 24 to the input terminal 26 of a microprocessor 28, which turns off the system and/or displays the error on the instrument panel.

The signal, filtered and ready for processing, travels to an amplifier circuit 21 by way of a connection 32. The amplified signal can now be supplied to the input terminal 27 of a microprocessor 28 by way of a connection 25.

The signal is processed in microprocessor 28, which also accommodates the unrepresented velocity of the body.

When accordingly the wheel mass rises more rapidly than the body mass and when there is a vibration absorber, the force of the absorber will also accelerate the body mass upward, which can cause the whole vehicle to start vibrating. The purpose of the processing circuit in this case is to disengage the absorber, meaning that the force of the accelerated wheel mass will be transferred to the vehicle's suspension. There will be no transfer to the body mass. This semi-actively controlled chassis ensures substantially improved riding safety and comfort.

The vibration absorber is prevented from breaking down in that the absorption is switched to a higher lever just before the upper dead center.

The object of the invention accordingly provides an inexpensive and precise means of measuring the velocity of a wheel mass in relation to that of a body mass and of controlling the forces of absorption with the equivalent E signal by way of the processing electronics.

We claim:

1. A vibration-absorber sensor for measuring relative velocity between a motor vehicle body and axle, comprising: a wheel suspension; a variable or controllable hydraulic vibration absorber having an absorber cylinder at one end connected to said wheel suspension, said hydraulic vibration absorber having a moving piston rod at another end connected to said body and traveling in and out of said cylinder; a stationary housing open at one end and matching the shape of said cylinder and forced over said cylinder, said housing secured to said piston rod; an absorption valve and a processing circuit connected to said valve for varying or controlling said valve; said housing being made of anti-magnetic material and accommodating a sensor winding with leads extending outward; a magnet positioned at an untensioned end of said cylinder and on the surface of a cap of said cylinder; velocities of said piston including a distance-dependent and direction-dependent voltage signal in said sensor winding; said processing circuit supplying a signal for varying or controlling the absorption valve in accordance with the particular relative velocity of the piston.

2. A vibration-absorber sensor as defined in claim 1, wherein said sensor winding is embedded in plastic and comprises said housing.

3. A vibration-absorber sensor as defined in claim 1, wherein said sensor winding is embedded in rubber and comprises said housing.

4. A vibration-absorber sensor as defined in claim 1, wherein said sensor winding is embedded in plastic and rubber and comprises said housing.

5. A vibration-absorber sensor as defined in claim 1, wherein said sensor winding is embedded in aluminum and comprises said housing.

6. A vibration-absorber sensor as defined in claim 1, including an anti-magnetic spacer between said magnet and said cap.

* * * * *